US008092228B2

(12) United States Patent
Benedetto et al.

(10) Patent No.: US 8,092,228 B2
(45) Date of Patent: Jan. 10, 2012

(54) TERMINATION FOR TELECOMMUNICATION AND DATA ENGINEERING (75) Inventors: Adrian Benedetto, Berlin (DE); Harald Klein, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 13/177,148

(22) Filed: Jul. 6, 2011

(65) Prior Publication Data
US 2011/0263139 A1 Oct. 27, 2011

Related U.S. Application Data (63) Continuation of application No. 12/668,381, filed as application No. PCT/EP2008/005072 on Jun. 24, 2008, now Pat. No. 8,002,556.

(30) Foreign Application Priority Data

Jul. 9, 2007 (DE) .......................... 10 2007 032 577

(51) Int. Cl.
H01R 12/00 (2006.01)
(52) U.S. Cl. ......................................................... 439/61
(58) Field of Classification Search .................. 439/61, 439/49, 533, 719.1, 676; 326/826, 827
See application file for complete search history.

(56) References Cited

U.S. PATENT DOCUMENTS

| 5,325,270 A | 6/1994 | Wenger |
| 5,572,400 A * | 11/1996 | Roesner et al. .......... 361/679.58 |
| 5,600,542 A | 2/1997 | Malgouires |
| 5,800,215 A | 9/1998 | Dohnke et al. |
| 6,567,271 B2 * | 5/2003 | Stone et al. .................... 361/724 |
| 6,741,463 B1 | 5/2004 | Akhtar et al. |
| 6,955,550 B2 | 10/2005 | Schlack |
| 7,037,118 B2 | 5/2006 | Neumetzler et al. |
| 7,059,864 B2 | 6/2006 | Matthies et al. |
| 7,407,389 B2 | 8/2008 | Busse et al. |
| 7,548,434 B2 | 6/2009 | Busse et al. |
| 7,618,261 B2 | 11/2009 | Busse et al. |
| 7,623,343 B2 * | 11/2009 | Chen ......................... 361/679.32 |
| 2004/0057216 A1 | 3/2004 | Smith et al. |
| 2005/0117309 A1 | 6/2005 | Rieken et al. |

(Continued)

FOREIGN PATENT DOCUMENTS

DE 1 262 383 5/1965

(Continued)

*Primary Examiner* — Tulsidas C Patel
*Assistant Examiner* — Harshad Patel
(74) *Attorney, Agent, or Firm* — Merchant & Gould P.C.

(57) ABSTRACT

The invention relates to a termination (1) for telecommunication and data engineering, comprising a housing (10) which contains terminal strips for connecting up a prescribed number of pairs, wherein the housing (10) is designed to have mounting means which can be used to mount the housing (10) on supports, wherein the terminal strips are in the form of printed circuit board connectors (50), wherein the housing (10) contains a plurality of printed circuit boards (60) which are accessible from the front and at least one side portion (12) of the housing (10), wherein the printed circuit board connectors (50) are plugged onto the printed circuit boards (60) from the front of the housing (10) and are plugged onto the printed circuit boards (60) from the side portion(s) (12) of the housing (10), wherein the printed circuit boards (60) hold conductor tracks which are respectively used to connect a contact on a printed circuit board connector (50) from the front to a contact on the printed circuit board connector (50) from the side portion(s) (12) via the respective common printed circuit board (60).

20 Claims, 6 Drawing Sheets

U.S. PATENT DOCUMENTS

| | | |
|---|---|---|
| 2006/0023430 A1 | 2/2006 | Karstens |
| 2006/0114660 A1 | 6/2006 | Busse et al. |
| 2006/0286824 A1 | 12/2006 | Busse et al. |
| 2007/0086709 A1 | 4/2007 | Nijhuis |
| 2009/0011633 A1 | 1/2009 | Busse et al. |
| 2009/0029588 A1 | 1/2009 | Neumetzler et al. |
| 2010/0188824 A1 | 7/2010 | Benedetto et al. |
| 2010/0195818 A1 | 8/2010 | Benedetto et al. |

FOREIGN PATENT DOCUMENTS

| | | |
|---|---|---|
| DE | 30 03 634 | 7/1981 |
| DE | 39 12 951 | 10/1990 |
| DE | 93 101 55 | 9/1993 |
| DE | 100 43 723 | 3/2002 |
| DE | 102 36 361 | 3/2004 |
| DE | 103 39 844 | 1/2005 |
| DE | 103 41 694 | 2/2005 |
| DE | 10 2004 017 605 | 10/2005 |
| DE | 10 2004 043 764 | 2/2006 |
| FR | EP 0 681 421 | 11/1995 |
| WO | WO 03/079644 | 9/2003 |
| WO | WO 2004/008589 | 1/2004 |
| WO | WO 2005/060274 | 6/2005 |

* cited by examiner

TERMINATION FOR TELECOMMUNICATION AND DATA ENGINEERING

This application is a Continuation of U.S. Ser. No. 12/668, 381, filed 8 Jan. 2010, now U.S. Pat. No. 8,002,556, which is a National Stage Application of PCT/EP2008/005072, filed 24 Jun. 2008, which claims benefit of Serial No. 10 2007 032 577.2, filed 9 Jul. 2007 in Germany and which applications are incorporated herein by reference. To the extent appropriate, a claim of priority is made to each of the above disclosed applications.

BACKGROUND

The invention relates to a terminal head for telecommunication and data engineering.

In existing copper telecommunication networks, the access network is constructed as a radial network in most cases. In this network configuration, the main cables are brought out of the switching office and distributed to the various cable distributors of the corresponding subscriber regions. The main cable is distributed to the various cable distributors via cable sleeves. From the cable sleeves, the distributed main cables then go to the cable distributors where they are connected to terminal heads and are run as distribution cables in the respective streets of the subscribers. The connection to the terminal distribution box of the subscriber is then made in most cases by means of a sleeve in the distribution cable. Due to this fanning out of the network toward the subscriber, the connection of the main cables at the subscriber or line side at the main distributor is the only location in the access network where all connections (lines) run together in space and can be centrally tested. The number of terminal heads in a cable distributor is dependent on the type of construction of the cable distributor, but a typical value is about 12 terminal heads per cable distributor.

A terminal head consists, for example, of a mounting or receiving shell for 10 terminal strips which, in turn, can in each case connect 10 pairs. Thus, 100 pairs can be connected by means of one terminal head. The receiving shell is then preferably hooked into the cable distributor rack with preassembled clamping nuts, and the clamping nuts then snap in behind the rack rails. The receiving shell is then clamped by tightening fitting screws and a ground connection is made.

The rack rails can be dimensioned in length in such a manner that a number of terminal heads can snap in (for example three), or can be designed for only one terminal head.

From DE 10 2004 017 605 A1, a connector for circuit boards is known comprising a number of contact elements, the contact elements in each case having two connecting sides, one connecting side being constructed as insulation displacement contact for connecting wires and the other connecting side being constructed as forked contact for contacting terminal areas on the circuit board.

SUMMARY

The invention is based on the technical problem of creating a terminal head which has a higher terminal density.

For this purpose, the terminal head for telecommunication and data engineering comprises a housing in which terminal strips are arranged for interconnecting a predetermined number of pairs, the housing being constructed with attachment means by means of which the housing can be attached to carriers, the terminal strips being constructed as circuit board connectors, wherein, in the housing, a number of circuit boards are arranged which are accessible from the front and at least one side part of the housing, the circuit board connectors being plugged onto the circuit boards from the front of the housing and plugged onto the circuit boards from the side or sides of the housing, wherein on the circuit boards in each case conductor runs are arranged via which in each case one contact of a circuit board connector of the front is connected to one contact of a circuit board connector of the side part or parts via the in each case common circuit board. This makes it possible to halve the constructional height of the terminal head since twice the number of pairs can be connected in the rows of the front. Although this leads to a widening of the terminal head in the front area, it is uncritical as long as the available width in the cable distributor is not exceeded. On the other hand, the lateral arrangement of the circuit board connectors of the system side has the effect that the entire front is available for patching to the subscriber side. As a result, the terminal density of the terminal head can be doubled compared with conventional terminal heads. The circuit board connectors have contact elements which have a connecting side for connecting wires and a connecting side for contacting a circuit board, the connecting side for the circuit board preferably being constructed as forked contact and the connecting side for the wires preferably being constructed as insulation displacement contact. It should be noted that other contacts or circuit board connectors can be additionally plugged onto the circuit board from the rear.

Express reference is made to DE 10 2004 017 605 A1 with regard to a preferred actual construction of the circuit board connectors.

In a preferred embodiment, the circuit board connectors are plugged onto the circuit boards from both side parts.

In a further preferred embodiment, the housing is constructed to be stepped, the front of the housing being wider than the rear of the housing. This creates space for attachment to the carrier and patching space for cables and wires. It should be noted that, in principle, apart from a stepped construction of the housing, trapezoidal tapering toward the rear is also possible, for example.

In a further preferred embodiment, the side parts of the housing in each case have at least three parts, wherein a first part forms a front part of the side part, a second part forms a center piece of the side part and a third part forms a rear part of the side part, the third part having slots for receiving the circuit board connectors.

In this arrangement, the first and third part are preferably arranged in parallel with one another.

Furthermore, the second part is preferably arranged at a right angle at least to the first and/or third part.

In a further preferred embodiment, the second part is aligned at a right angle to the third part and, via an intermediate piece, at an obtuse angle to the first part.

In a further preferred embodiment, the second part has indentations between which the circuit boards are guided and held. In this arrangement, other parts of the side parts or also other housing parts such as, for example, the rear wall, can be constructed with such indentations in a supplementary manner or have other means for guiding and/or holding the circuit boards.

In a further preferred embodiment, the first part of a side part is constructed with tabs, the number of tabs preferably corresponding to the number of rows with circuit boards from the front. Furthermore, the tabs are preferably constructed with elastic cutouts.

In a further preferred embodiment, the second parts of the side parts have support parts for a lid part and a bottom part.

In a further preferred embodiment, the housing consists partially of metal or of a metalized plastic, the side parts, one rear wall and the bottom and lid parts preferably consisting of metal or of a metalized plastic.

In a further preferred embodiment, a front part which has slots for the circuit board connectors is arranged at the front, the front part preferably consisting of plastic.

In a further preferred embodiment, the front part is held by the elastic cutouts of the tabs of the first parts of the side parts.

In a further preferred embodiment, a limb for attaching a cable is arranged at the rear wall.

In a further preferred embodiment, the front part is constructed with cable guides and/or a labeling panel.

The cable guides preferably cover the tabs of the first part of the side parts at least laterally toward the outside.

In a further preferred embodiment, the circuit board connectors, which are plugged on from the front, are equipped with arrester magazines.

BRIEF DESCRIPTION OF THE DRAWINGS

In the text which follows, the invention will be explained in greater detail with reference to a preferred exemplary embodiment. The figures show in.

DETAILED DESCRIPTION

Figure 1:
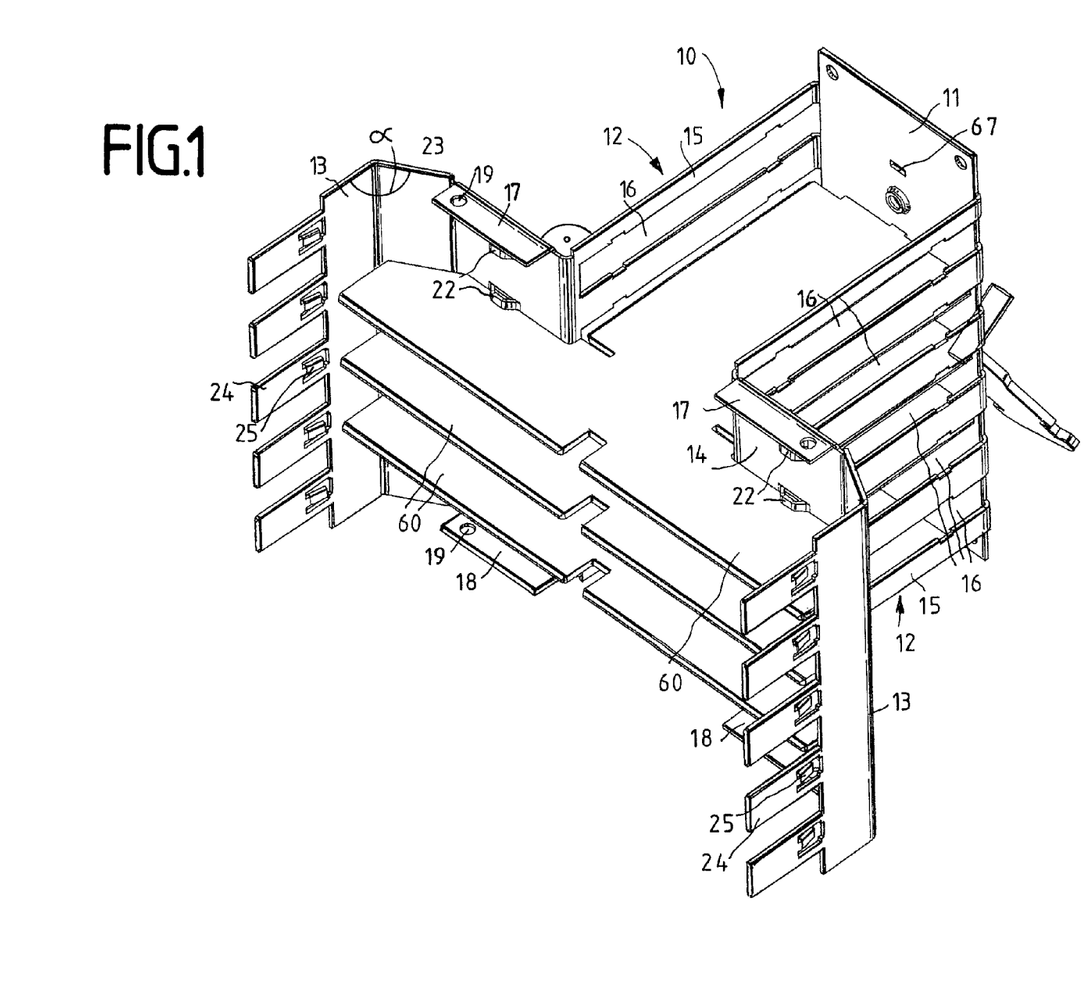
FIG. 1 a perspective front view of a part of a housing with inserted circuit boards, FIG. 2 a perspective rear view of a terminal head, FIG. 3 a diagrammatic representation of a circuit board, FIG. 4 a perspective front view of a terminal head with circuit board connectors partially removed, FIG. 5 a perspective top view of the terminal head with lid part removed, and FIG. 6 a perspective detail representation of the arrangement of side part and front part.
Figure 2:
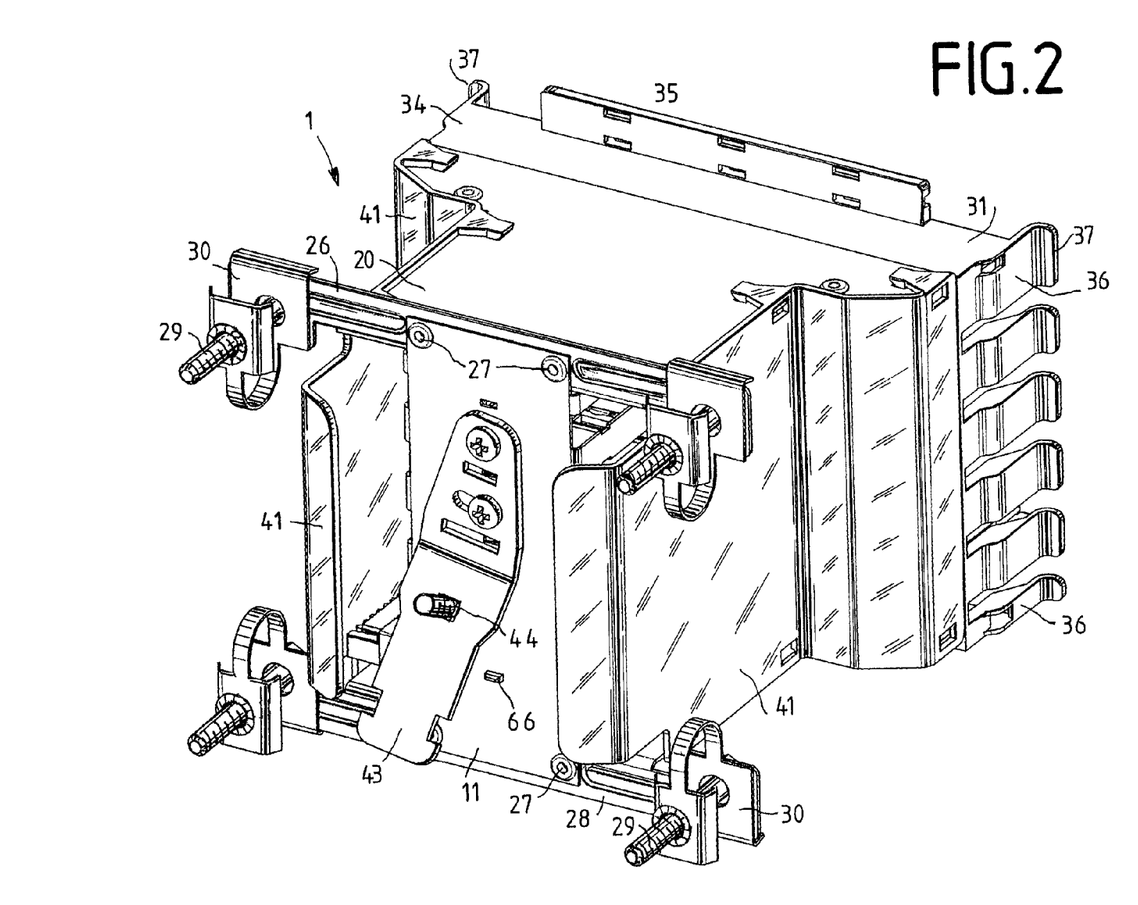

FIG. 1 shows a part of a housing 10 of a terminal head. The housing 10 comprises a rear wall 11 and two side parts 12, rear wall 11 and side part 12 preferably being permanently connected to one another or being constructed of one piece. Each side part 12 has a first part 13, a second part 14 and a third part 15. The third part 15 is in each case constructed with five slots 16 for receiving circuit board connectors 50 (see FIG. 4). In this arrangement, the third part 15 is arranged at a right angle to the rear wall 11 and at a right angle to the second part 14, the corner formed by the two parts 14, 15 being rounded. The two parts 14 are with support parts 17, 18, which are in each case arranged at the top and the bottom of the second part 14. The support parts 17, 18 are angled at right angles from the second part 14 and have drilled holes 19. The support parts 17 are used for attaching a lid part 20 and the support parts 18 are used for attaching a bottom part 21 (see FIG. 4). The attachment is preferably made by means of a riveted connection or a screwed connection. Furthermore, the second part 14 is constructed with indentations 22, the number of indentations 22 being at least twice as large as the number of circuit boards 60 to be accommodated. The circuit boards 60 are in each case located between two indentations 22 of a side part 12. It should be noted that, in the example shown, the topmost and bottom-most circuit boards 60 are missing. The second part 14 is connected to the first part 13 via an intermediate piece 23, the intermediate piece 23 being arranged at an obtuse angle α to the first part 13. At the first part 13, five tabs 24 with elastic cutouts 25 are arranged, the function of which will still be explained later. Apart from the rear wall 11 already described and the side parts 12, the housing 10 also comprises a lid part 20 and a bottom part 21 (see also FIGS. 2 and 4). At the lid part 20, a rail 26 is arranged which is bent toward the top. The rail 26 is then connected to the rear wall 11 preferably via two riveted connections 27. The bottom part 21 is correspondingly connected to a rail 28 and also connected to the rear wall 11 via two riveted connections 27. At the two outer ends, the rails 26, 28 in each case have drilled holes 42 (see FIG. 5) through which a screw 29 can be inserted. The housing 10 or the terminal head, respectively, can then be attached, as known from the prior art, to carrier rails which preferably have a U-shaped profile, by means of the screws 29 and a clamping nut 30.

Figure 4:
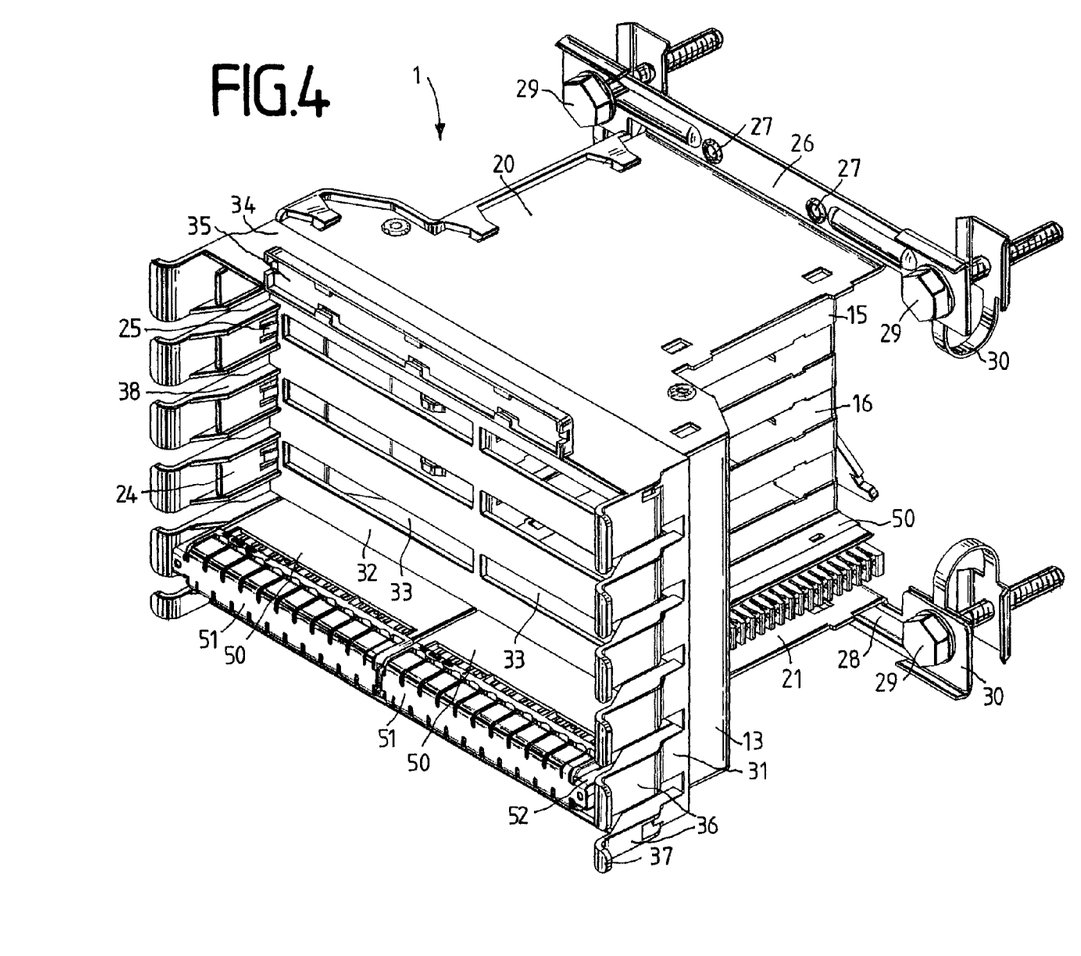
Figure 5:
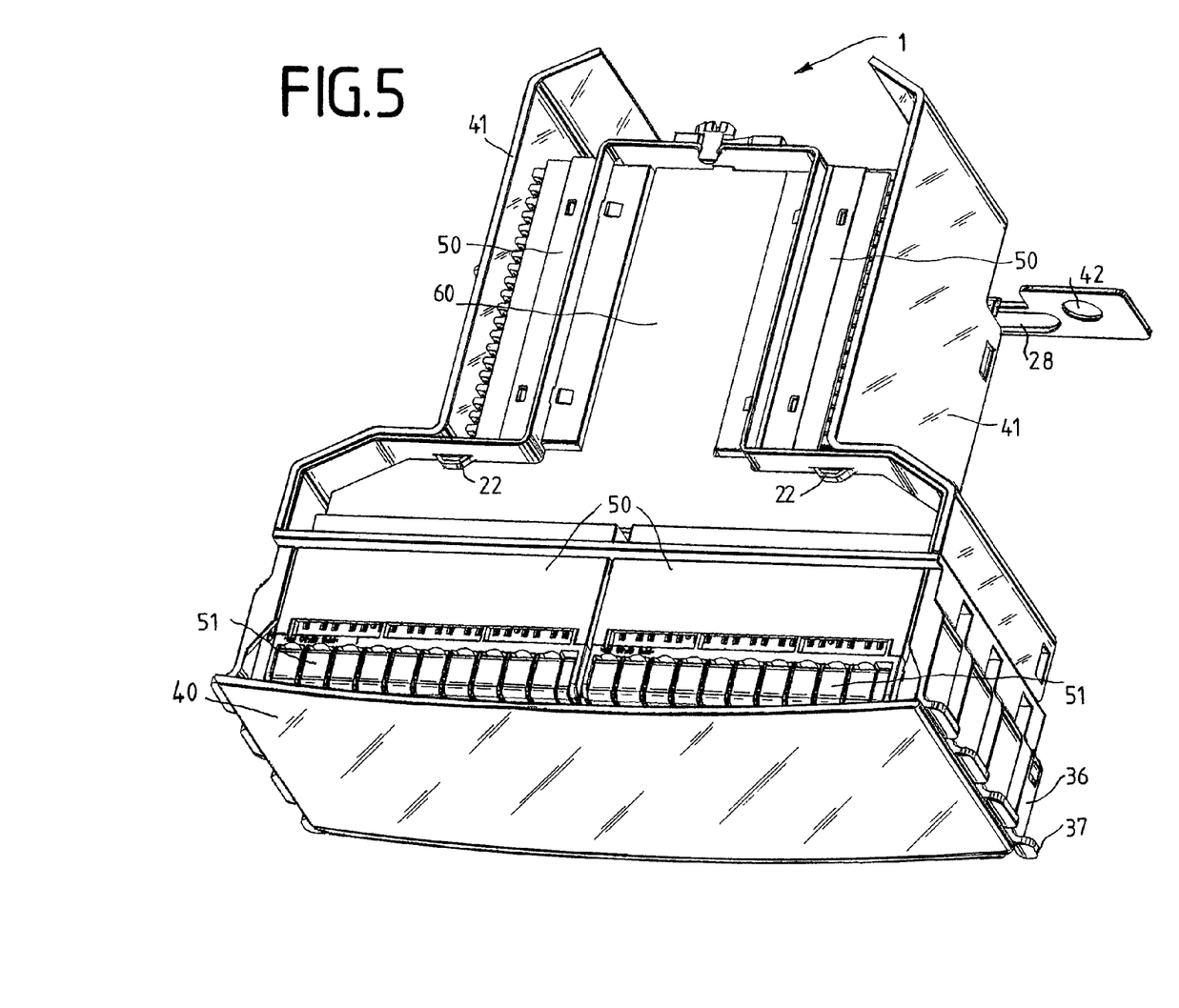
Figure 6:
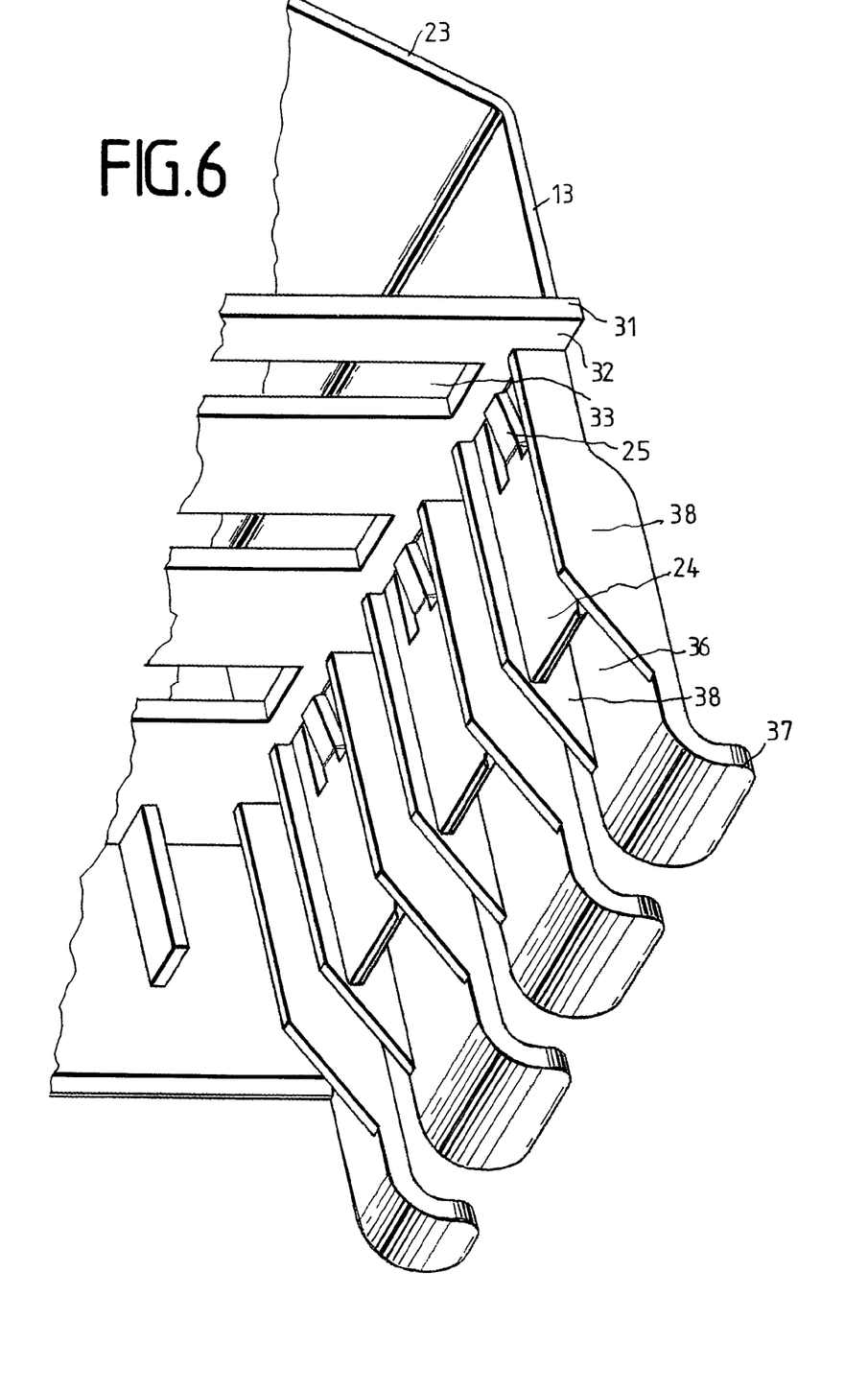

The housing 10 also comprises a front part 31 of plastic which can be seen particularly well in FIG. 4. The front part 31 forms the front side of the housing 10 and has a plane 32, the plane having ten slots 33 for the circuit board connectors 50, two slots 33 in each case being arranged in a horizontal row. At the top 34 of the front part 31, a labeling panel 35 is arranged. On the side at the front part 31, six cable guides 36 extend in each case, the bottom-most cable guide 36 being narrower than the other cable guides. At the end facing away from the housing 10, the cable guides 36 have outwardly pointing rounded developments 37. As can be seen particularly well in FIG. 6, the cable guides 36 are parallel to the tabs 24 and cover these laterally toward the outside. The cable guides 36 have other lateral bends 38 which in each case protrude inward pointing from the top edge and the bottom edge of the cable guide. In this arrangement, the bends 38 also cover the tabs 24 from the top and bottom side. This effectively prevents cables or wires passing the cable guides 36 on the side coming into contact with the metallic tabs 24. The bottom-most cable guide 36 also prevents wires or cables from passing the sharp metallic edge of the bottom part 21. The elastic cutouts 25 lock the front part 31 pressed on so that it is permanently connected to the side parts 12.

Figure 3:
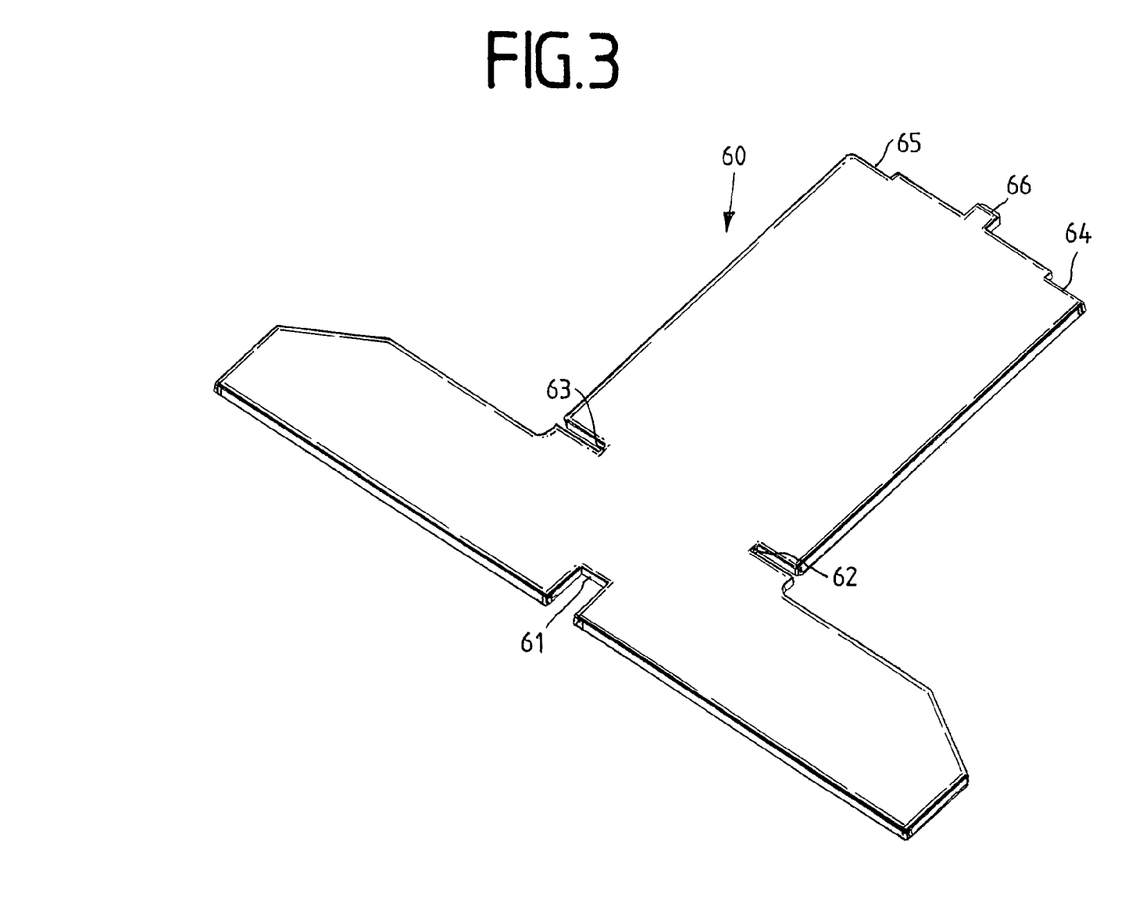

FIG. 4 will be used for further explaining the further assembly of the terminal head 1. After the front part 31 has been pushed on, or even before that, the circuit board connectors 50 are inserted into the slot 16 of the two side parts 12, which also secures the circuit boards 60 against being pulled out. Subsequently, the circuit board connectors 50 are then inserted into the slots 33. After that, the circuit board connectors 50 can be equipped with arrester magazines 51, ground contacts constructed as dual forked contacts 52 being plugged onto the tabs 24 so that the ground contact of the arrester magazine 51 is electrically connected to the metallic carrier rails via the tabs 24, the metallic housing 10 and the clamping nut 30. It should be noted that FIG. 4 only shows the circuit board connectors 50 of the bottom-most row. So that the lateral housing edges of the circuit board connectors 50 do not prevent the plugging onto the circuit board 60, each circuit board 60 has a number of cut-ins 61-65 (see FIG. 3). To further stabilize the circuit board 60 in the housing, the circuit board 60 has a web 66 which engages a slot 67 in the rear wall 11. The contact pads and conductor runs which in each case connects a contact of a circuit board connector 50 which is plugged into the front part 31 to a contact of a circuit board connector 50 which is plugged into the side part 12 are not shown. In the example shown, the circuit board connectors 50 are in each case designed for connecting ten pairs. Thus, 100 pairs are connected from the front and 50 pairs are in each case connected from the sides. The right-hand circuit board connector 50 of the front part 31 is preferably connected via the circuit board 60 to the circuit board connector 50 of the right-hand side part 12. The circuit board 60 is preferably constructed as multi-layer board. The way the conductor runs are run in the different layers of the board then makes it possible selectively to implement capacitive couplings in order to reduce crosstalk. It should be noted that, in principle, the circuit board connectors do not need to be constructed in the same manner. Thus, for example, the front part 31 can use one 20-pair circuit board connector 50 per row, only one slot 33 per row then being needed correspondingly. Furthermore, the circuit board connectors 50 of the side parts 12 do not need an interface for the arrester magazines 51. The interface for the arrester magazines 51 is preferably constructed as insulation stripping or forked contact.

Once the terminal head 1 has been completely equipped, a cap 40 and side cladding parts 41 can be pushed onto the housing 10. The side cladding parts 41 spatially separate the system wires connected to the circuit board connectors 50 of the side parts 12 from laterally passing jumper wires of adjacent terminal heads. To attach an incoming cable, a limb 43 is screwed to the rear wall 11. The limb 43 can be continuously adjusted by approx. 10° in both directions by slightly loosening the two screws, so that the cables can be more easily run past one another at the rear. Furthermore, the limb has a drilled hole through which a screw 44 is inserted. To attach the cable, the cable cladding can then be perforated and screwed to the limb 43.

As can be seen particularly well in FIG. 4, much space is available for running cables and wires between the first part 13 and the third part 15.

It should also be noted that functional elements such as arrester elements or also splitters can be arranged on the circuit board 60, too. In the case of the splitter, attention must be paid to the fact that a contact must then be connected from the front for the subscriber to two contacts via the splitter (POTS and DSLAM). However, constructional forms are also possible wherein the splitters are integrated into the circuit board connectors 50 themselves or are plugged on in the form of plugs or magazines.

LIST OF REFERENCE DESIGNATIONS

1 Terminal head
10 Housing
11 Rear wall
12 Side parts
13 First part
14 Second part
15 Third part
16 Slots
17, 18 Support parts
19 Drilled holes
20 Lid part
21 Bottom part
22 Indentations
23 Intermediate piece
24 Tabs
25 Cutouts
26 Rail
27 Riveted connections
28 Rail
29 Screws
30 Clamping nut
31 Front part
32 Plane
33 Slots
34 Top side
35 Labeling panel
36 Cable guides
37 Bends
38 Bends
40 Cap
41 Side cladding parts
42 Drilled holes
43 Limb
44 Screw
50 Circuit board connector
51 Arrester magazine
52 Dual forked contact
60 Circuit board
61-65 Cut-ins
66 Web
67 Slot

The invention claimed is:

1. A terminal head for telecommunication and data engineering, comprising:
a housing having a first side, a second side, and a rear end that define an interior of the housing, the housing also having an open front end through which access to the interior of the housing is provided;
a plurality of circuit boards disposed in the housing, each of the circuit boards having a front end that is accessible through the open front end of the housing, and each of the circuit boards having a first end that is accessible through the first side of the housing;
a first plurality of first circuit board connectors, each first circuit board connector being connected to the front end of a respective one of the circuit boards through the open front of the housing; and
a second plurality of second circuit board connectors, each second circuit board connector being connected to the first end of a respective one of the circuit boards through the first side of the housing, each of the second circuit board connectors being electrically connected via the respective circuit board to the first circuit board connector that is connected to the respective circuit board.

2. The terminal head as claimed in claim 1, further comprising a third plurality of third circuit board connectors, each third circuit board connector being connected to a second end of a respective one of the circuit boards through the second side of the housing, each of the third circuit board connectors being electrically connected via the respective circuit board to the first circuit board connector that is connected to the respective circuit board.

3. The terminal head as claimed in claim 2, wherein each side of the housing defines a plurality of apertures through which the second and third circuit board connectors are connected to the circuit boards.

4. The terminal head as claimed in claim 3, wherein the apertures are defined at the rear of the sides of the housing.

5. The terminal head as claimed in claim 1, wherein the open front end of the housing is wider than the rear end of the housing.

6. The terminal head as claimed in claim 5, wherein a front portion of each side of the housing is parallel with a rear portion of the side.

7. The terminal head as claimed in claim 6, wherein an intermediate portion of each side extends laterally between the front and rear portions of the side.

8. The terminal head as claimed in claim 1, wherein the housing includes attachment members by which the housing can be attached to carriers.

9. The terminal head as claimed in claim 1, wherein the first and second sides of the housing each define indentations between which the circuit boards are held.

10. The terminal head as claimed in claim 9, wherein an intermediate portion of each of the first and second sides of the housing defines the indentations.

11. The terminal head as claimed in claim 10, wherein the intermediate portions of the first and second sides face the open front end of the housing.

12. The terminal head as claimed in claim 1, further comprising a plurality of tabs extending forwardly from the first and second sides of the housing.

13. The terminal head as claimed in claim 12, wherein the tabs define elastic cutouts.

14. The terminal head as claimed in claim 1, further comprising a front part coupled to the housing at the open front end of the housing, the front part defining a plurality of slots through which the first circuit board connectors extend to connect to the circuit boards disposed in the housing.

15. The terminal head as claimed in claim 14, wherein the front part is formed of plastic.

16. The terminal head as claimed in claim 15, wherein the housing is formed at least partially of metal or of a metalized material.

17. The terminal head as claimed in claim 14, wherein the front part defines cable guides.

18. The terminal head as claimed in claim 14, wherein the front part defines a labeling panel.

19. The terminal head as claimed in claim 1, wherein a limb for attaching a cable is disposed at the rear end of the housing.

20. The terminal head as claimed in claim 1, wherein the first circuit board connectors are equipped with arrester magazines.

* * * * *